United States Patent [19]
Herfeld

[11] 3,770,251
[45] Nov. 6, 1973

[54] APPARATUS FOR MIXING PLASTICS MATERIALS AND THE LIKE DURING PROCESSING THEREOF

[76] Inventor: Friedrich Walter Herfeld, Wall 1, Neuenrade, Germany

[22] Filed: Nov. 8, 1971

[21] Appl. No.: 196,496

[52] U.S. Cl. .............................................. 259/103
[51] Int. Cl. ............................................... B01f 7/00
[58] Field of Search .................. 259/6, 21, 41, 64, 259/103

[56] References Cited
UNITED STATES PATENTS

| 989,468 | 4/1911 | Youlten | 259/103 X |
| 3,134,576 | 5/1964 | Lodige et al. | 259/64 X |
| 3,430,925 | 3/1969 | Buhner | 259/6 X |
| 1,548,935 | 8/1925 | Craddock | 259/103 |
| 3,165,300 | 1/1965 | Balistrieri | 259/6 |

FOREIGN PATENTS OR APPLICATIONS

| 2,015,246 | 10/1970 | Germany | 259/41 |

Primary Examiner—Harvey C. Hornsby
Assistant Examiner—Philip R. Coe
Attorney—Allison C. Collard

[57] ABSTRACT

A mixer for mixing plastics materials, chemicals or pharmaceutical products during processing thereof comprising a mixing container, having a vertically disposed longitudinal axis and a lower cylindrically shaped portion and an upper frustum-shaped portion, a power-driven stirring blade vertically disposed through the bottom wall of the container, and a plurality of power-driven mixing blades selectively distributed over and extending through the frustum-shaped portion of the container. The stirring and mixing blades are powered by electric motors, and have triangular cross-sectional shapes which force the material being mixed against the walls of the container to produce, along with the blades and the material, frictional heat required during the mixing process.

6 Claims, 2 Drawing Figures

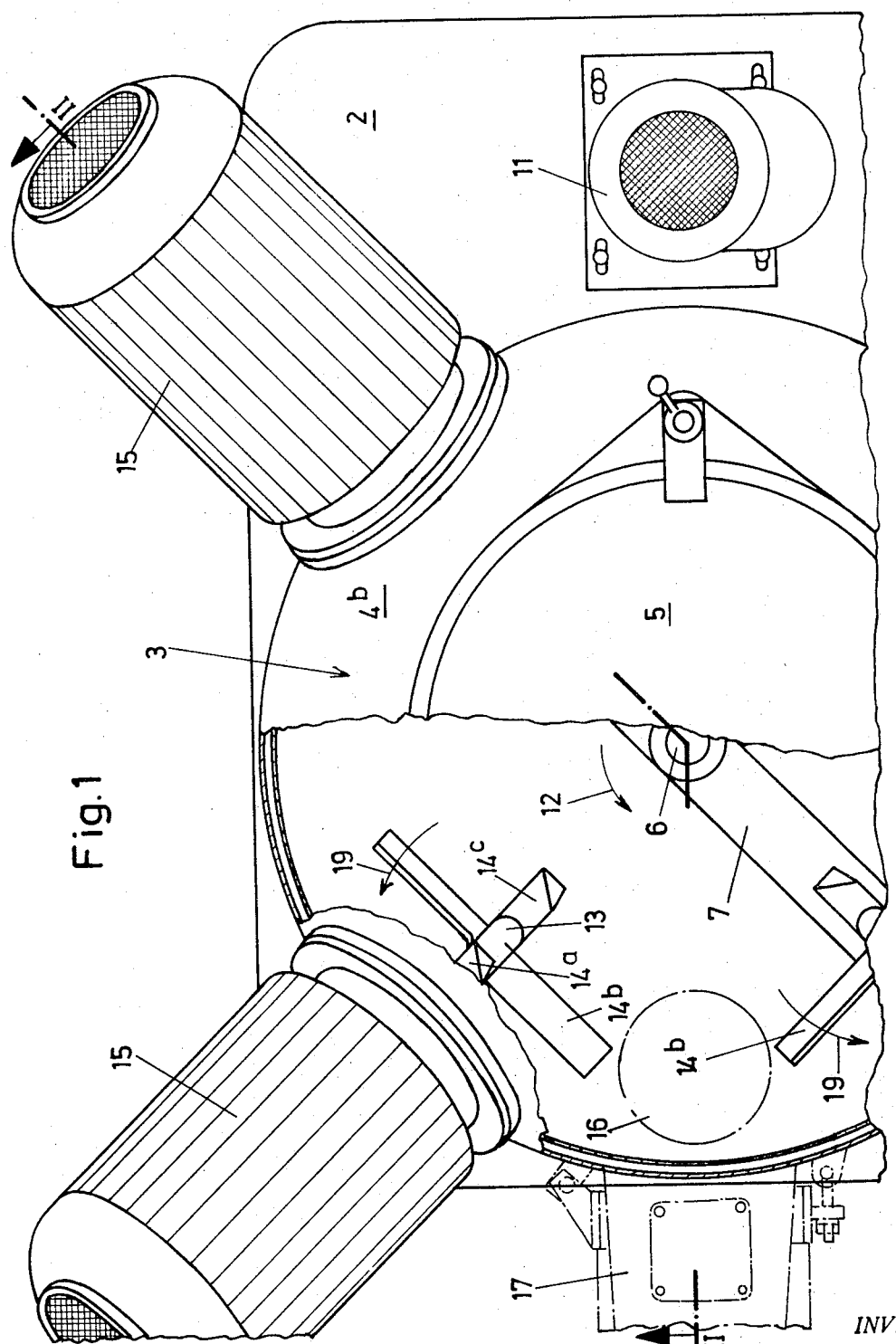

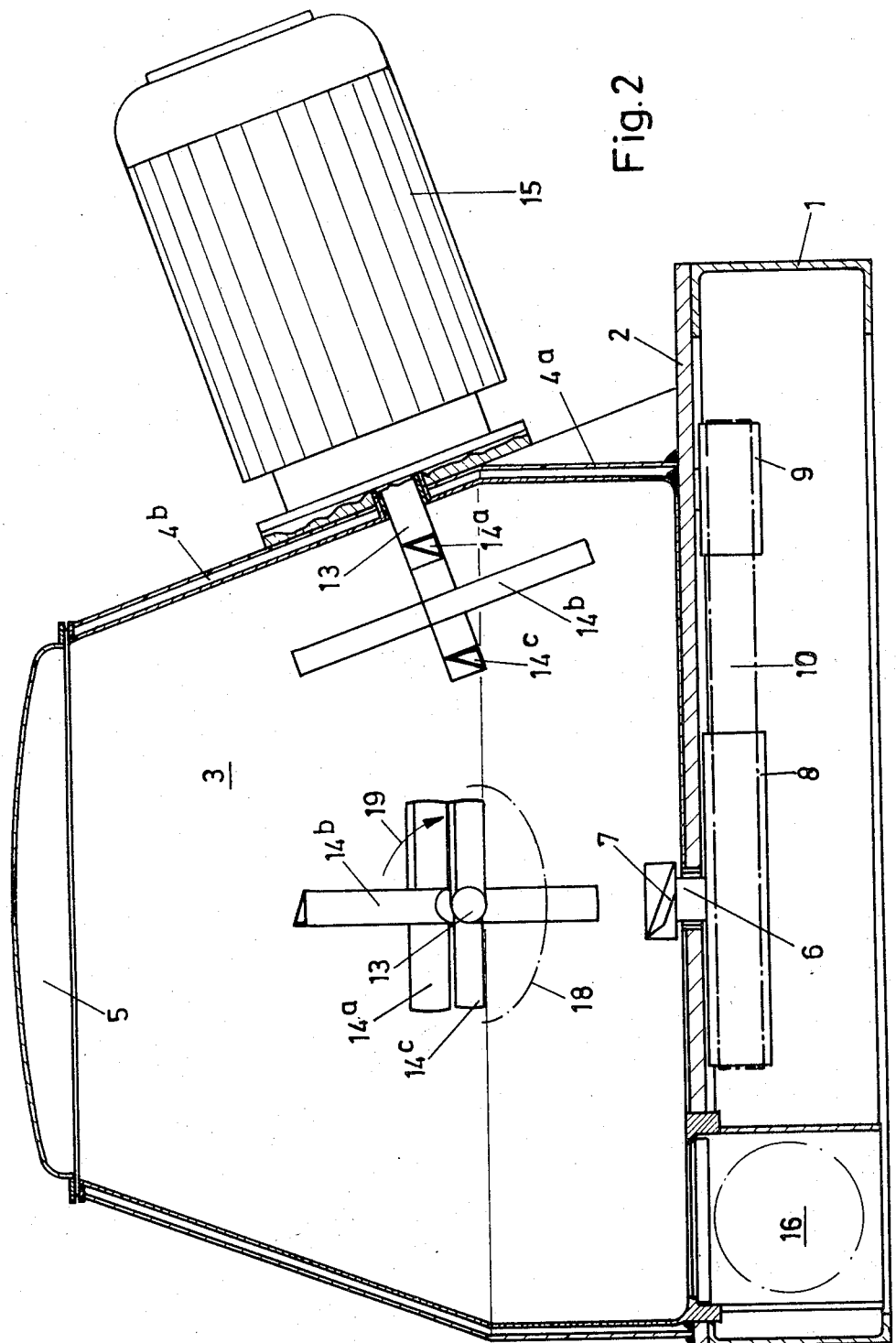

APPARATUS FOR MIXING PLASTICS MATERIALS AND THE LIKE DURING PROCESSING THEREOF

The present invention relates to a mixer, and in particular to a mixer for mixing plastics materials, chemicals, or pharmaceutical products during processing thereof.

During the preparation of plastics materials, chemicals or pharmaceutical products, the materials must be mixed with the required processing additives and simultaneously heated to produce gelling, plasticizing, drying of the plastic or absorption of the additives. One method of producing the necessary heat is to generate it by friction through the interaction of a rotatable mixing element and the material being processed. For example, with plastics, a mixer having an upright mixing container and a stirrer shaft disposed through the bottom surface thereof is used which mixes the material with its rotational movement and simultaneously heats the material by the frictional heat generated. However, since the power of the driving motor is limited, such a mixer can only process about 1,000 litres of material. To process this much material a driving motor of about 200 HP is required. Larger driving motors are too expensive to be economically acceptable. And, since power regulation must be considered, the driving motor should preferably be a pole changing motor.

It is therefore an object of the present invention to provide a mixer which generates frictional heat for simultaneously mixing and heating the material and which may be used in very large mixing containers with large amounts of material.

Accordingly, the present invention provides a mixer in which a plurality of driving shafts are selectively distributed over the container periphery and extend through the side wall of the container. The shafts carry mixing blades which are positioned at the level of the surface of the material to be mixed so that only parts of the mixing blades dip into the material. The parts of the blades which mix the material rotate in the direction of rotation of the material during mixing.

The novel aspect of the invention is that it separates the production of the rotary movement from the production of frictional heat. Even where very large quantities of material must be mixed, a comparatively small electric motor is sufficient to produce the rotary movement. Since a plurality of driving shafts with mixing blades are distributed over the periphery of the container side wall of producing the frictional heat, the drive of each driving shaft may be comparatively small in size and yet attain a high total power consumption. The mixing blades also accelerate the rotary movement of the material mixed since they rotate substantially faster than the material, and it is thereby possible to convert a considerable quantity of power into friction to heat the material. The mixing blades are also positioned so that they push the material towards the container walls, and thereby produce shear forces in addition to the frictional forces.

It is also an object of the present invention to provide a mixer which is simple in design, easy to manufacture, and efficient and reliable in operation.

Other objects and features of the present invention will become apparent from the following detailed description taken in connection with the accompanying drawings which disclose one embodiment of the invention. It is to be understood, however, that the drawings are designed for the purposes of illustration only, and are not intended as a definition of the limits and scope of the invention.

In the drawings, wherein similar reference numerals denote similar elements throughout the several views:

FIG. 1 is a partial broken away top view of a plastics mixer constructed in accordance with the present invention; and FIG. 2 is a cross-sectional side view of the mixer taken along section II—II of FIG. 1.

Referring to the drawings, there is shown a base frame 1 having a container bottom 2 and a mixing container 3 mounted thereon. The side wall of the container has a cylindrical portion 4a and a frustum-shaped portion 4b, and may be constructed in any suitable conventional manner as a double wall. The mixing container also has a cover 5 for opening and closing the top thereof.

A stirring shaft 6 having stirring blades 7 attached to its end, is disposed through bottom wall 2, and is driven through belt pulleys 8 and 9 and a belt 10 by an electric motor 11. Stirring blades 7 rotate in the direction of arrow 12.

A plurality of driving shafts 13 extend into the interior of the container through the frustum-shaped portion 4b of the container side wall. In the illustrated embodiment, driving shafts 13 are inclined towards bottom wall 2, and each carries a plurality of mixing blades 14a, 14b and 14c. Each driving shaft is also coupled directly to the output shaft of an electric motor 15.

As shown in the drawings, the mixing blades have a triangular cross-section. The surface of the blades are angled with respect to the direction of rotation so that the mixing blades push the material towards the container wall. It should be noted, however, that this effect may be accomplished with mixing blades having other profiles, and the apparatus is not limited to the blades shown.

Four driving shafts 13 are spaced apart with respect to each other by an angle of 90° and are distributed over the periphery of the mixing container side wall. Up to six driving shafts may be provided, if desired, or only one may be used. An outlet 16 having an operating control 17 is also provided in bottom wall 2.

The filling height of the mixing container corresponds approximately to the height of the cylindrical portion 4a of the container side wall. As a result, during mixing, the mixing blades always dip into the material as they pass along the lower half of curve 18 of their rotational path. The blades rotate in the direction of arrow 19 so that the parts of the mixing blades which dip into the material always rotate in the direction of roation of the material. Stirring blades 7 produce a whirl-type rotary movement of the material near the center of the container and mixing blades 14a, 14b and 14c support this rotary movement by additionally accelerating the material at its periphery and forcing it towards the container wall. This results in high shearing forces, particularly in the areas between the mixing blades, which generate a considerable amount of frictional heat in the material, and as a result the mterial mixed is well heated. The speed of the stirring shaft 6 may be low, but the driving shafts 13 must rotate at a much higher speed to produce substantial amounts of frictional heat.

For a mixing container having a capacity of 2,000 litres, a pole-changing driving motor of about 400 HP would be required if all the frictional heat were to be supplied by the rotation of stirrer blades on the bottom side of the container. This type of motor is only available by special production, which involves economically unacceptable expense. In contrast, the present invention uses an electric motor 11 of about 30 HP for the stirring mechanism. The speed of stirring blades 7 may be 50–500 rev/min, but is preferably about 70 rev/min. The speed of the electric motor 15 lies between several hundred and several thousand revolutions per minute. The motors are preferably pole-reversing and have power stages of 100 HP and 50 HP. It is thus apparent from the above discussion that even for mixing containers of much greater capacity, it is possible to use driving motors of sufficient power which are economically acceptable in expense. Motors 15 may also be separately regulated, so that a plurality of powder steps are obtained which combine to provide the total power devlivered. The amount of power may thus be adjusted in small increments.

FIGS. 1 and 2 illustrate mixing blades having triangular profiles, the sloping surfaces of which are directed towards the container wall. However, a similar effect can also be obtained if the sloping surface is directed towards the container axis, in which case the mixing blades create a suction force. It should be noted, however, that any other profile configuration and mode of operation may be used which produces a movement component directed towards the mixing container wall.

While only one embodiment of the present invention may be shown and described, it will be obvious to those persons skilled in the art that many changes and modifications may be made thereunto without departing from the spirit and scope of the invention.

What is claimed is:

1. A mixer for mixing plastic material, chemicals, pharmaceutical products, and the like during the processing thereof comprising:

a vertically disposed mixing container having a lower cylindrically shaped portion, an upper frustum-shaped portion and a substantially flat bottom portion;

a rotatable stirring shaft extending through the bottom portion;

a rotatable stirring blade disposed on the end of said shaft defined in said container and rotatable in a predetermined direction for rotating material in said container in said predetermined direction; at least one mixing shaft extending through the frustum-shaped portion of said container and disposed therethrough at a selected height above and inclined downwardly towards the bottom portion of said container; and at least one mixing blade disposed on said at least one mixing shaft and rotatable in a direction corresponding to said predetermined direction of said stirring blade so that as said container is filled with material to a level approximately adjacent the height at which said at least one mixing blade is disposed through said frustum-shaped portion, said mixing blade partially engages the material in said container and said stirring blade is caused to rotate in conjunction with the rotation of said mixing blade to thereby heat and stir the material.

2. The mixer as recited in claim 1, wherein said mixing blade has a triangular-shaped cross section, and is disposed in said container substantially parallel to said frustum-shaped portion thereof so as to force said material toward the walls of said container and thereby generate shear forces to produce frictional heat.

3. The mixer as recited in claim 2, further comprising an electric motor, mounted on the outside of said container, and having its output shaft coupled to said mixing blade, the power output of said motor being regulated so as to control the amount of frictional heat generated in the material mixed.

4. The mixer as recited in claim 3, wherein said mixing blade rotates at a speed between several hundred and several thousand revolutions per minute.

5. The mixer as recited in claim 3, wherein said stirrer blade rotates at a speed of between 50 and 500 revolutions per minute.

6. The mixer as recited in claim 3, wherein said mixing blade comprises a plurality of mixing blades mounted on a common mounting shaft.

* * * * *